SWITCHING MEANS FOR AM/FM/FM STEREO RADIO RECEIVER
Filed Jan. 16, 1967
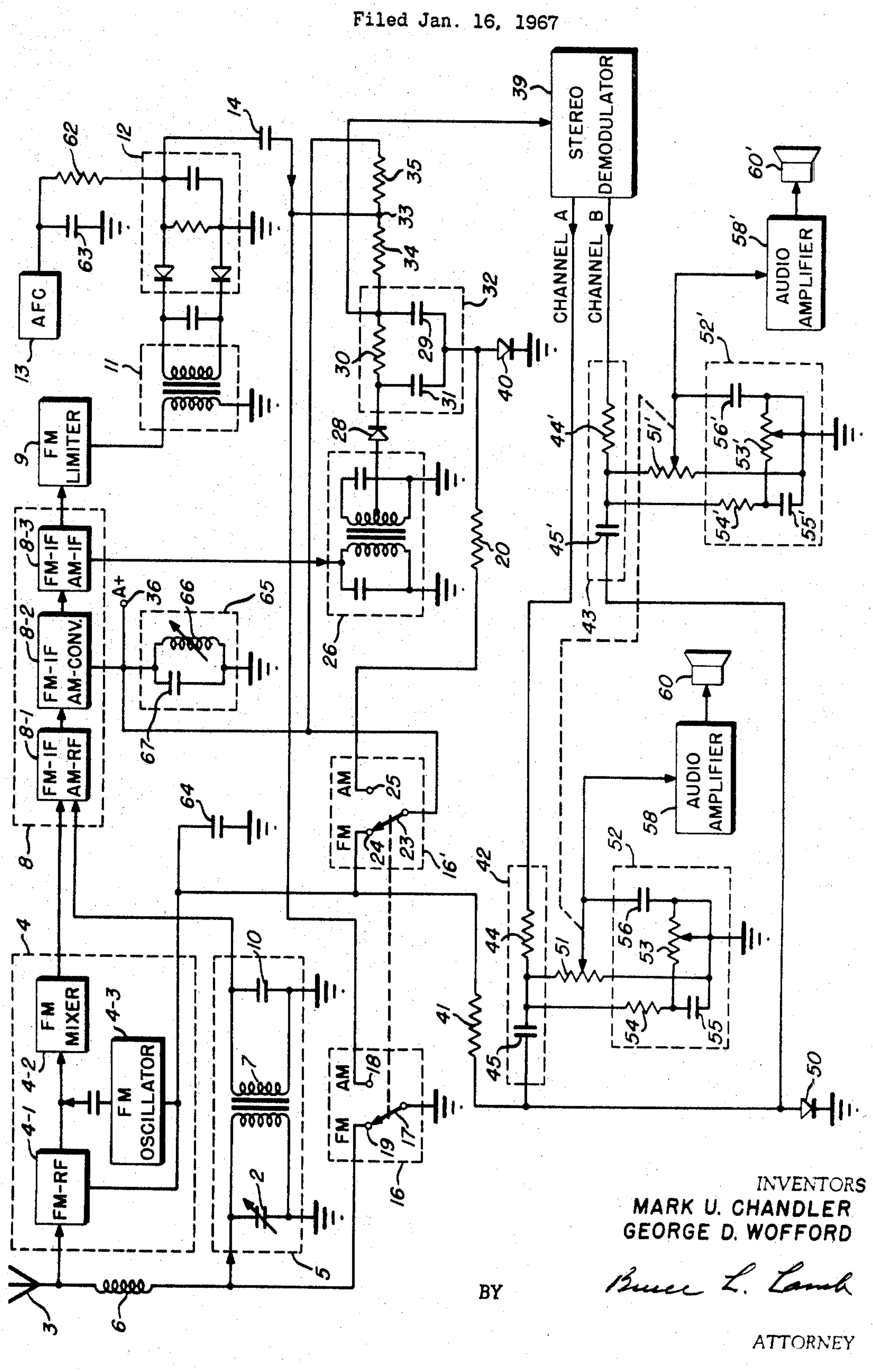
INVENTORS
MARK U. CHANDLER
GEORGE D. WOFFORD
BY Bruce L. Lamb
ATTORNEY 3,472,967

SWITCHING MEANS FOR AM/FM/FM STEREO RADIO RECEIVER

George D. Wofford, Glen Arm, and Mark Chandler, Baltimore, Md., assignors to The Bendix Corporation, Baltimore, Md., a corporation of Delaware Filed Jan. 16, 1967, Ser. No. 609,518
Int. Cl. H04j 1/02
U.S. Cl. 179—15 6 Claims

ABSTRACT OF THE DISCLOSURE

An AM/FM/FM stereo radio receiver wherein a double pole, double throw electrical switch is used to select either the AM or FM mode of operation.

CROSS REFERENCES TO RELATED APPLICATIONS

Reference is made to the U.S. patent application Ser. No. 413,466, filed Nov. 24, 1964, now Patent No. 3,389,-338, to Michael Slavin for "Simplified Band Switching for FM-AM Receivers."

BACKGROUND OF THE INVENTION

This invention relates to radio receivers which can operate either in AM or FM mode and wherein an FM signal containing stereo information can be divided into its individual channels. More particularly, this invention relates to a circuit for switching to AM or FM modes of operation.

As is well known, the signal to noise ratio of a frequency modulated radio frequency signal is dependent on the transmission bandwidth of the FM system. In commercial FM broadcast practice where a maximum modulating frequency of 15 kHz. is transmitted with a maximum frequency deviation of 75 kHz., a bandwidth of 200 kHz. is assigned. In practice, normal audio signals composed mainly of music and human voice have most of their energy concentrated at the lower frequencies. Since frequency deviation depends on the energy content of the audio signal the high audio frequencies seldom produce a 75 kHz. deviation. The lower frequency, high energy components of the audio signal will produce the full frequency deviation and hence occupy the entire allotted band while the higher frequency audio components will provide a much smaller frequency deviation. The FM signal will therefore not always fully occupy the entire bandwidth assigned to it with resultant lower signal to noise ratio than would result if the entire assigned bandwidth were used. In order to utilize the full FM bandwidth assigned, the higher frequency components of the audio signal are emphasized at the transmitter, that is, the energy content of the high frequency components relative to the low frequency components is increased. In order for the receiver to produce an audio signal which is a true reproduction of the audio signal at the broadcast studio before preemphasis, it is necessary for the receiver to remove the high frequency emphasis energy which was added at the FM transmitter. This may be done at the receiver by deemphasizing the received FM signal. In an AM/FM monaural receiver this deemphasis function is performed most economically and satisfactorily at the FM discriminator by the AM detector tweet filter which thereby performs the dual functions of deemphasis while the receiver is operating in the FM mode and AM audio filtering while the receiver is operating in the AM mode. Switching the AM/FM radio receiver from the AM mode of operation to a monaural FM mode can be nicely performed by a double pole, double throw switch. An example of how this can be accomplished is the subject of the cited reference application U.S. Ser. No. 413,466, filed Nov. 24, 1964, by Michael Slavin et al. for "Simplified Band Switching for FM-AM Receivers."

However, in an AM/FM/FM stereo receiver deemphasis cannot be tolerated at the FM discriminator before stereo demodulation because the higher frequency components contain the stereo information. The deemphasis must be added after stereo demodulation and it is essential that the deemphasis be applied in such a manner as not to affect AM audio response. Additionally, the AM tweet filter must be disabled during FM operation to prevent removal of stereo information from the FM signal prior to demodulation. The problem of switching from an AM mode to an FM stereo mode is thereby complicated by the necessity to alternatively insert and remove the AM tweet filter and the deemphasis from the receiving circuits. Following normal switching practice, at least a triple pole, double throw switch would be required. Such a switch is necessarily somewhat larger than a double pole, double throw switch and is incompatible with the current trend decreasing the size of electronic instruments. In addition, the larger switch is less reliable and requires more force to actuate.

SUMMARY OF THE INVENTION

Accordingly, dual deemphasis circuits have been provided and are inserted, one into each stereo audio channel when the radio receiver is in the FM or FM stereo mode of operation. The deemphasis is thereby added after the signal has been demodulated and separated into its stereo channels. Provision is made to disable the deemphasis circuits during the AM mode of receiver operation to prevent any distortion of the AM audio signals.

Provision is also made to remove the AM tweet filter from the FM signal path during FM operation of the radio receiver and to insert it into the AM signal path during AM operation. Additionally, the FM antenna circuit is disabled during AM operation of the receiver and the AM antenna circuit is disabled during FM operation of the receiver.

It is therefore an object of the present invention to devise a switching means for switching a radio receiver from the AM mode to an FM stereo mode of operation with minimum distortion of audio signals.

A further object is to produce a switching means having minimum size and maximum reliability consistent with good commercial practice.

BRIEF DESCRIPTION OF THE DRAWING

The drawing is a schematic diagram of an AM/FM/FM stereo radio receiver containing the subject invention.

DESCRIPTION OF THE PREFERRED EMBODIMENT

Referring to the drawing, with ganged double pole, double throw switch 16–16′ in the FM position, the antenna input to AM antenna circuit 5 is grounded through switch contact 19 and switch pole 17. Modulated radio frequency signals received on antenna 3 enter FM antenna circuit 4 which is tuned by inductor 6 to accept signals on the standard FM broadcast band. The FM antenna circuit 4 typically contains a stage of FM radio frequency amplification 4–1, an FM local oscillator 4–3, and an FM mixer 4–2 arranged so as to produce an FM modulated intermediate frequency signal. Power is supplied to the FM antenna circuit 4 from D.C. power source 36 through switch pole 23 and contact 24 of switch 16′. The FM signals enter converter 8 which contains a plurality of dual purpose amplification stages 8–1, 8–2, and 8–3 which amplify FM modulated intermediate frequency signals when the receiver is in the FM mode of operation. In the AM mode of operation FM intermediate frequency amplifier 8–2 operates as a combination AM oscillator and mixer. AM oscillator frequency is determined by tunable tank circuit 65 which includes capacitor 67 and variable inductance 66. However, in the FM mode of operation, capacitor 64 is placed across the AM oscillator tank circuit by pole 23 and contact 24 of switch 16'. This turns off the AM oscillator and eliminates this source of interference during FM operation. The FM intermediate frequency signal amplitude is standardized in FM limiter 9 and coupled through transformer 11 tuned to accept IF signals to FM discriminator 12. The FM signal is then coupled through capacitor 14 and resistor 34 to stereo demodulator 39. A portion of the discriminator 12 output is coupled to the AFC 13 through the AFC filter consisting of resistor 62 and capacitor 63. Diode 40 which is normally non-conductive to the low level of the FM signal appearing at point 33 effectively disables AM tweet filter 32 consisting of resistor 30 and capacitors 29 and 31, hence the FM signal enters demodulator 39 through resistor 34 with its high frequency components unattenuated by capacitors 29 and 31. If stereo information is contained in the FM signal, the demodulator splits the FM signal into two audio channels A and B in accordance with the stereo information. If the receiver is tuned to a monaural FM signal, the demodulator will split the FM signal into two equally weighted audio channels A and B. Diode 50, which is normally non-conductive to the low level audio signal appearing across it, is forward biased by source 36 through switch pole 23 and contact 24 of switch 16' into a conductive state. Current limiting resistor 41 effectively limits the current through diode 50. The preemphasized high frequencies contained in audio channels A and B are attenuated in deemphasis networks 42 and 43, respectively, to proper levels. The time constant of the deemphasis circuit is chosen to conform with transmitting preemphasis standards. Currently this standard time constant is 75 microseconds. The frequency transfer function of the deemphasis circuit is chosen to be the inverse of the frequency transfer function of the preemphasis circuit for minimum audio distortion. These standard values for preemphasis circuits are set by the Federal Communications Commission. The stereo audio signals are further attenuated in dual volume controls 51, 51' and weighed in dual tone controls 52, 52' consisting of dual tone control potentiometers 53, 53', dual bass boost circuits consisting of resistors 54, 54' and capacitors 55, 55' and dual treble cut-off capacitors 56, 56'. The audio signals are amplified in dual audio amplifiers 58, 58' and applied to dual sound transducers 60, 60'.

With switch 16, 16' in the AM position, the ground at the input terminal of AM antenna circuit 5 is removed. The AM antenna circuit typically consists of transformer 7 and capacitors 2 and 10, tuned to pass radio frequency signals in the AM broadcast band. The AM signals then pass through AM antenna circuit 5 into converter 8 which converts the radio frequency signals into amplitude modulated intermediate frequency signals. It was previously noted that converter 8 contains a plurality of dual purpose stages which serve to amplify the FM intermediate frequency signals. Since switch 16' is in the AM position, FM antenna circuit 4 is deenergized, eliminating interfering signals from that source. Additionally, capacitor 64 has been removed from AM oscillator tank circuit 65, allowing AM mixer/oscillator 8–2 to oscillate. The AM radio frequency signals are amplified in dual purpose stage 8–1, and then mixed in dual purpose stage 8–2 with the locally generated AM oscillator signals to produce AM intermediate frequency signals. The AM intermediate frequency signals are then amplified in dual purpose stage 8–3. These IF signals are coupled to AM detector 28 through IF tuned transformer 26. Switch 16 in the AM position, through contact 18, grounds junction 33 thereby removing the back bias from AM detector diode 28. Additionally, a forward bias is applied to tweet filter blocking diode 40 by voltage source 36 through pole 23 and contact 25 of switch 16'. Current through diode 40 is limited by resistor 20. The amplitude modulated IF signals are rectified by diode 28 and the IF carrier signals are removed by tweet filter 32 grounded through forward biased diode 40. The audio frequency signals appearing across resistor 34 are coupled into demodulator 39. Since no stereo information is contained on the audio signals, the FM demodulator splits the audio signals into two equally weighted audio channels. Since switch 16' is in the AM position, the forward bias to diode 50 has been removed and diode 50 is non-conductive to the audio signals, effectively removing deemphasis capacitors 45, 45' from the audio channels A and B. The audio signals are then amplified in dual audio amplifiers 58, 58' and applied to dual speakers 60, 60'.

Although we have shown what we consider to be the preferred embodiment of our invention, certain alterations and modifications will become apparent to one skilled in the art. We do not wish to limit our invention to the specific form shown and accordingly hereby claim as our invention the subject matter including modifications and alterations thereof encompassed by the true scope and spirit of the appended claims.

What is claimed is:

1. In a radio receiver having a first antenna circuit responsive to amplitude modulated radio frequency signals, a second antenna circuit responsive to preemphasized monaural frequency modulated radio frequency signals and preemphasized frequency modulated radio frequency signals containing stereophonic information, a source of direct current power, converting means including an AM oscillator tank circuit connected between said source of direct current power and ground, said converting means producing amplified amplitude modulated intermediate frequency output signals and amplified frequency modulated intermediate frequency output signals in response to signals from said antenna circuits, a frequency modulation discriminator connected to receive the frequency modulated output of said converter, an AM detector connected to receive the amplitude modulated output of said converting means and normally biased to block said amplitude modulated converting means output, a capacitor having a low impedance to signals produced in said AM oscillator tank circuit, a demodulator automatically separating input signals into dual audio frequency channels in response to stereophonic information contained in said input signals, said demodulator being connected to receive the output of said discriminator, dual volume controls, one in each said audio frequency channel, for attenuating said audio signal, and dual audio amplifiers responsive to said attenuated audio signal, an improved means for selecting FM or AM receiver modes, comprising, a normally disabled AM tweet filter connected between said AM detector and means enabling said AM tweet filter normally disabled dual deemphasis means, one said deemphasis means connected in each said audio channel between said demodulator and said volume control, means enabling said dual deemphasis means, a switch having first and second poles switchable between AM and FM positions, said first pole being connected when in said FM position to disable said first antenna circuit and being connected when in said AM position to remove said blocking bias from said AM detector, said second pole being connected when in said FM position to activate said dual deemphasis enabling means, and shunt said capacitor across said AM oscillator tank circuit, and being connected when in said AM position to activate said AM tweet filter enabling means and disable said second antenna circuit.

2. A radio receiver as claimed in claim 1 wherein, said means enabling said AM tweet filter includes a first normally non-conducting diode connected between said AM tweet filter and ground, and means controlled by said switch for forward biasing said first diode, and said means enabling said dual deemphasis means includes a second non-conducting diode connected between said dual deemphasis means and ground and means controlled by said switch for forward biasing said second diode.

3. A radio receiver as claimed in claim 2 wherein connections to said switch include, grounding said first switch pole whereby when said first switch pole is in said FM position the input to said first antenna circuit is grounded, thereby disabling said first antenna circuit, and when said first switch pole is in said AM position said AM detector blocking bias is grounded, thereby removing said blocking bias, and connecting said power source to said second switch pole whereby when said second switch pole is in said FM position forward bias is applied to said second diode, thereby enabling said dual deemphasis means, and when said second switch pole is in said AM position power is removed from said second antenna circuit thereby disabling said second antenna circuit, and forward bias is applied to said first diode thereby enabling said AM tweet filter.

4. A radio receiver as claimed in claim 2 wherein said first and second diodes, when unbiased, present a high impedance to the signals normally appearing thereacross.

5. A radio receiver as claimed in claim 1 wherein each said dual deemphasis means has a time constant equal to and a frequency transfer function inversely equal to Federal Communications Commission standards for radio transmitter preemphasis circuits.

6. A radio receiver as claimed in claim 2 wherein each said dual deemphasis means consists of a serially connected resistor and capacitor, the junction of said resistor and capacitor being connected to said volume control input, the free end of said resistor being connected to said demodulator, and the free end of said capacitor being grounded through said second diode.

References Cited

UNITED STATES PATENTS

| | | | |
|---|---|---|---|
| 2,516,272 | 7/1950 | Thompson | 325—315 |
| 3,201,695 | 8/1965 | Mason | 325—315 |
| 3,243,708 | 3/1966 | Manson | 325—317 |
| 3,339,025 | 8/1967 | Csicsatka. | |
| 3,389,338 | 6/1968 | Slavin | 325—316 |

RALPH D. BLAKESLEE, Primary Examiner

U.S. Cl. X.R.

32.5—316, 317